United States Patent
Odebrecht et al.

(10) Patent No.: US 6,321,996 B1
(45) Date of Patent: Nov. 27, 2001

(54) SUPPLEMENTARY HEATER FOR OPEN VEHICLES

(75) Inventors: Wolfgang Odebrecht, Sindelfingen; Gunter Siegel, Horb, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/514,852

(22) Filed: Feb. 28, 2000

(30) Foreign Application Priority Data

Feb. 26, 1999 (DE) ................................. 199 08 500

(51) Int. Cl.[7] ........................................ B60H 1/02
(52) U.S. Cl. ............................. 237/12.3 A; 454/120
(58) Field of Search ............................. 454/119, 126, 454/142, 121, 156, 104, 105, 120; 237/12.3 A, 12.3 R, 12.3 B, 46; 296/70

(56) References Cited

U.S. PATENT DOCUMENTS

| | | | |
|---|---|---|---|
| 4,352,321 | * | 10/1982 | Fukui et al. .......................... 454/16 |
| 4,593,609 | * | 6/1986 | Nagatomo et al. ................. 454/253 |
| 5,101,883 | * | 4/1992 | Kinmartin et al. .................... 165/1 |
| 5,619,862 | * | 4/1997 | Ruger et al. ........................ 62/409 |
| 6,105,667 | * | 8/2000 | Yoshinori et al. .................. 165/202 |

FOREIGN PATENT DOCUMENTS

| | | |
|---|---|---|
| 92 01 474 | 5/1992 | (DE) . |
| 197 00 739 | 1/1997 | (DE) . |

* cited by examiner

*Primary Examiner*—Harold Joyce
*Assistant Examiner*—Derek S. Boles
(74) *Attorney, Agent, or Firm*—Crowell & Moring LLP

(57) ABSTRACT

A supplementary heating system for open motor vehicles, such as convertibles or roadsters, supplies warm air to shoulder and neck areas of vehicle occupants sitting in the vehicle seats. For preventing comfort-reducing draft phenomena when driving slowly and when stopped in front of a traffic light in the open vehicle, each heating module assigned to a vehicle seat has a heat exchanger, an air outlet nozzle arranged downstream of the heat exchanger and having an outflow direction into the shoulder and neck area, as well as an airstream inflow opening with an inflow funnel and a fan air inflow opening which are both arranged upstream of the heat exchanger and are separated from one another.

20 Claims, 3 Drawing Sheets

SUPPLEMENTARY HEATER FOR OPEN VEHICLES

BACKGROUND AND SUMMARY OF THE INVENTION

This application claims priority of DE 199 08 500.5, filed Feb. 26, 1999, the disclosure of which is expressly incorporated by reference herein.

The invention relates to a supplementary heating system for open motor vehicles, such as roadsters or convertibles, for supplying warm air to the shoulder and neck area of vehicle occupants sitting in vehicle seats.

A known supplementary heating system of this type (German Patent Document DE 197 00 739 C1—corresponding to U.S. Pat. No. 5,839,774) has a flat design and is integrated in a wind partition which is arranged behind the backrests of the vehicle seats and covers the headrest area. The heating system heats the cold air flowing through the wind partition because of the reverse flow of the airstream and thus reduces disturbing draft air phenomena when driving without the top and thereby permits a driving without the top also at low outside temperatures. In one embodiment, the heat exchanger of the heating system in the form of an electric heating wire mesh is arranged in the frame of the wind partition. In another embodiment, the heat exchanger is attached as an inherently rigid structure in parallel to the wind partition and is fastened to the latter by means of fastening elements.

In the case of an also known supplementary heating system of this type (German Patent Document DE 92 01 474 U1), for reducing the draft air phenomena which are bothersome to the vehicle occupants when driving with an open top, air currents are supplied in a targeted manner to the vehicle occupants shoulder and neck area, which air currents flow out of an air outflow device which is arranged in the headrest area of the vehicle seats and is directed diagonally upwards toward the rear. For generating these air currents, air is collected from inflow openings provided on the vehicle and is supplied, as the result of ram pressure, to the air outflow device.

Both supplementary heaters have the disadvantage that, when the vehicle is driving slowly or is stopped, for example, in front of a traffic light, the warm air supply to the vehicle occupants' shoulder and neck area will no longer be sufficient.

It is an object of the invention to improve a supplementary heater of the initially mentioned type such that, independently of the momentary operating mode of the vehicle, a sufficient warm air supply to the vehicle occupants' shoulder and neck area will always be ensured and thus, when driving with an open top, draft phenomena from the rear are compensated at any time.

According to the invention, the object is achieved by providing a supplementary heating system of the above-mentioned type, wherein a heating module is assigned to each vehicle seat, and each heating module comprises: a heat exchanger, an air outflow nozzle arranged downstream of the heat exchanger and having an air outflow direction into an occupant shoulder and neck area, an airstream inflow opening arranged upstream of the heat exchanger and having an inflow funnel exposed to aerodynamic return or reverse flow of an outside airstream, and a fan air inflow opening arranged upstream of the heat exchanger and separated from the airstream inflow opening.

The supplementary heating system for open vehicles according to the invention has the advantage that the fan air boosts the dynamic heating by way of the airstream and, also when there is no airstream, ensures a supply of warm air to the vehicle occupants' neck and shoulder area. The dynamic air and the fan air act upon the same heat exchanger, are heated there and, by way of the same outflow nozzle, arrive in the respective vehicle occupant's shoulder and neck area.

Advantageous embodiments of the supplementary heating system according to the invention with expedient developments and further developments of the invention are described herein and in the claims.

According to a preferred embodiment of the invention, the heat exchanger is accommodated in a modular housing on which the air outflow nozzle and the inflow funnel are constructed. The separation of the airstream inflow opening and the fan air inflow opening takes place by means of a separating wall which connects a smaller portion of the air inlet surface of the heat exchanger with the fan air inflow opening, and the larger portion of the air inlet surface of the heat exchanger with the airstream inflow opening. This separating wall prevents that the fan air already flows out into the open in front of the heat exchanger. Since, during a slow drive or when the vehicle is stopped, only a small amount of warm air is required for a sufficient warming of the shoulder and neck area, the small heat exchanger surface acted upon by the fan air will be completely sufficient. This also has the advantage that only a low fan output is required and the fan may therefore have a small size.

According to advantageous embodiments of the invention, the separating wall is conceived as a swivellable air flap which, in its one swivelling end position, is capable of completely covering the airstream inflow opening. The air flap controls the dynamic air quantity and is simultaneously a guiding surface for the fan to the heat exchanger.

According to an advantageous embodiments of the invention, two air blow-out connection pieces of a single fan, which is conceived as a radial-flow fan, which are offset with respect to one another in the circumferential direction by approximately 180°, are connected to both fan air inlet openings. Such a fan construction is particularly suitable for vehicles with narrow installation conditions and supplies a sufficient amount of air while the electric efficiency is good.

Other objects, advantages and novel features of the present invention will become apparent from the following detailed description of the invention when considered in conjunction with the accompanying drawings.

DETAILED DESCRIPTION OF THE DRAWINGS

Figure 1:
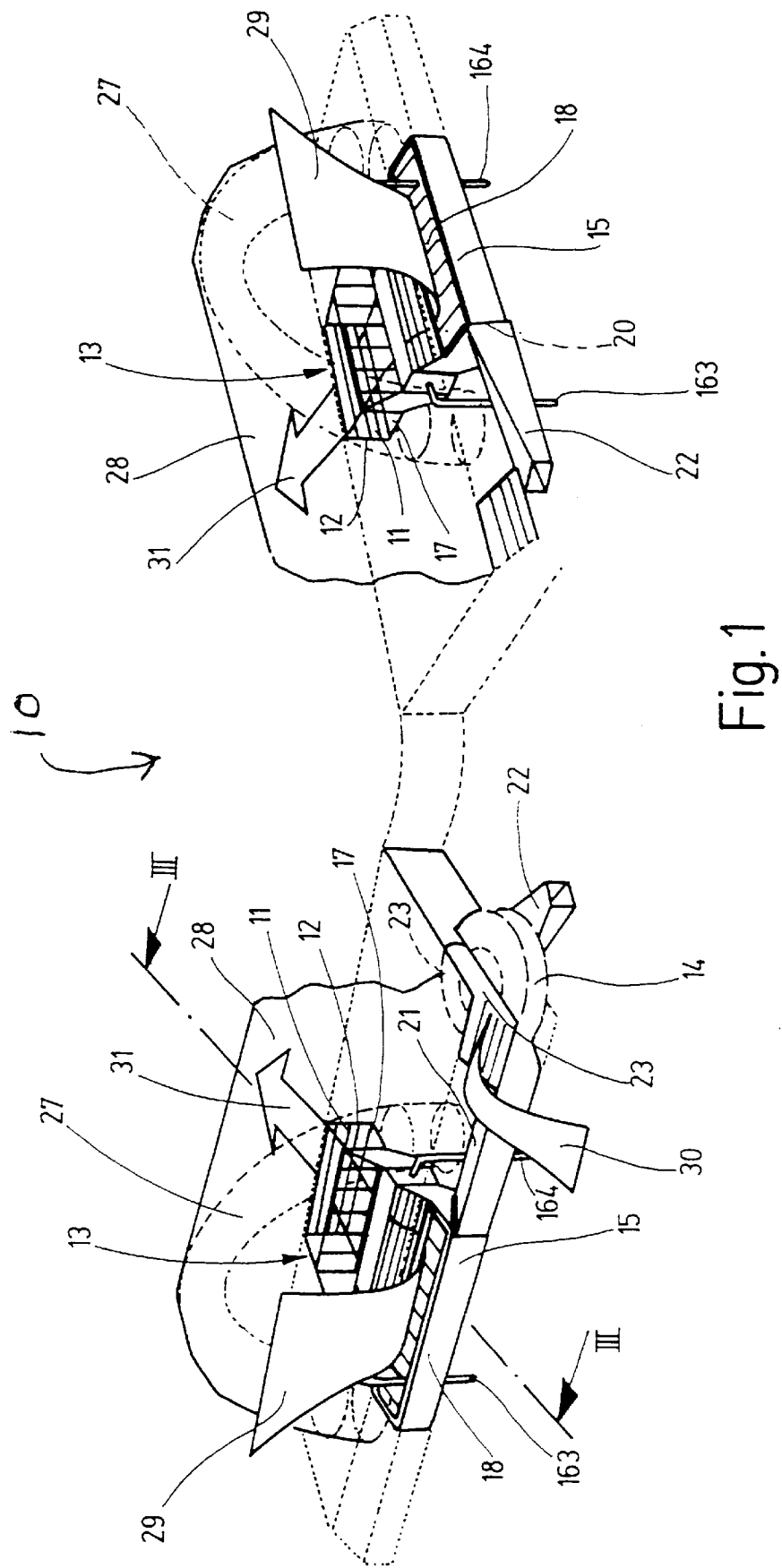
FIG. 1 is a schematic perspective view of a supplementary heating system for open vehicles which is cut open in the center for an improved view and in which the two parts are swivelled away from one another; constructed according to a preferred embodiment of the invention.

The supplementary heating system illustrated in FIG. 1 for an open motor vehicle, such as a roadster or a one-or twoseat convertible, is used for warming by means of warm air the shoulder and neck area of the vehicle occupants seated in two vehicle seats arranged side-by-side, in order to largely compensate bothersome draft phenomena from the rear when driving without a top and to also permit a driving in an open vehicle when the outside temperatures are low. In the vehicle body, the supplementary heating system is arranged behind the backrests of the two vehicle seats so that only the covering grids 11 of the supplementary heating system are still visible which visually cover the mouths 12 of the air outflow nozzles 17 required for the warm air outflow . In the case of a roadster or a two-seat convertible, the supplementary heating system is therefore integrated behind the backrests of the driver seat and front passenger seat and, in the case of a four-seat convertible, it is integrated behind the backrests of the two rear s eats in each case in the vehicle body.

Figure 2:
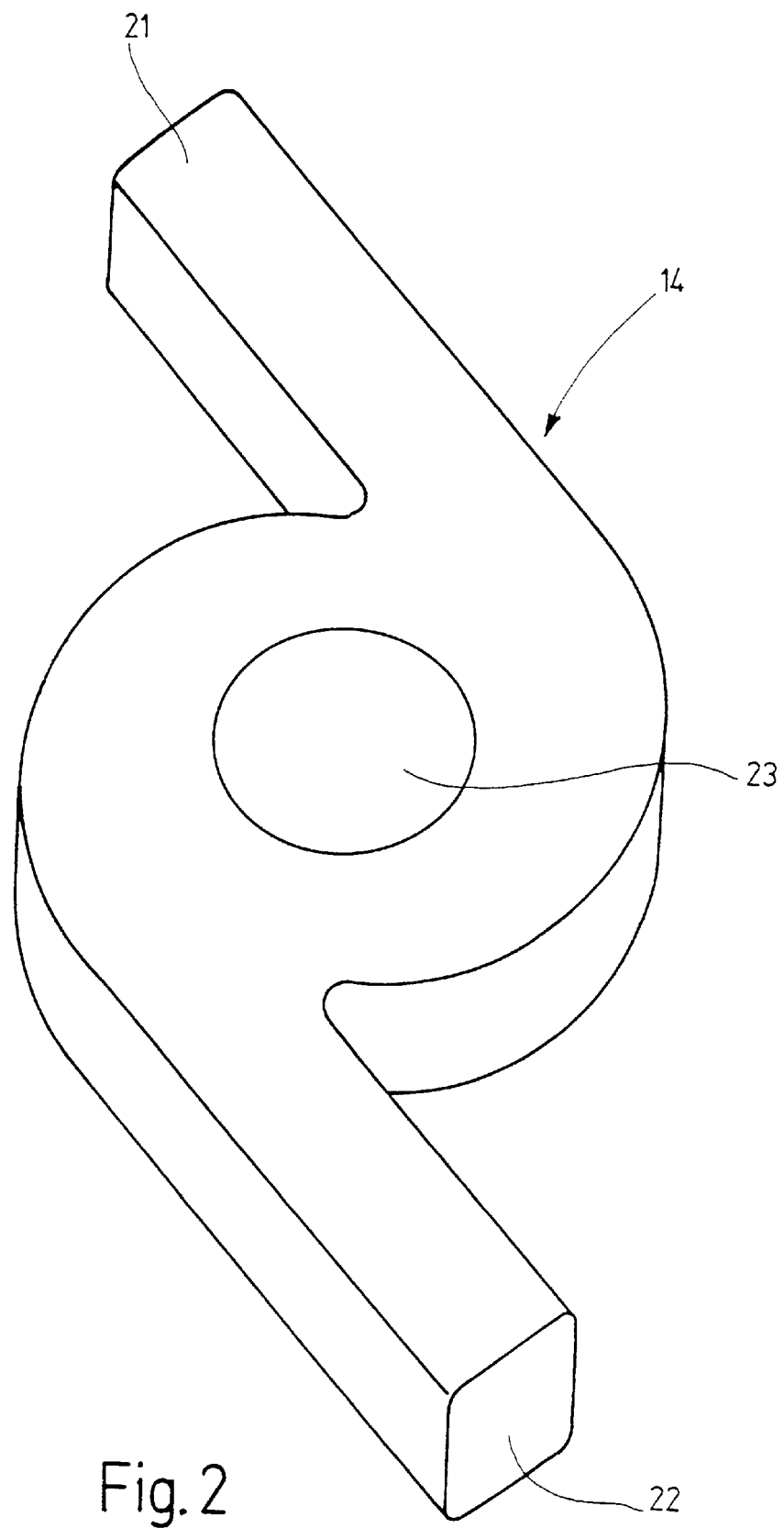
FIG. 2 is a schematic perspective view of the fan of the supplementary heating system in FIG. 1.

The supplementary heating system has two heating modules 13 each assigned to a vehicle seat as well as a fan 14 (FIG. 1 and 2), which are combined to a complete modular unit 10 which is ready to be installed. Each heating module 13 has a module housing 15 in which a heat exchanger 16 is accommodated which by way of an inflow pipe 163 and return flow pipe 164 is acted upon by means of a heat transfer medium, such as the cooling water of the internal-combustion engine of the motor vehicle. An electric heating of the heat exchanger 16 is also contemplated for certain preferred embodiments of the invention. Downstream of the heat exchanger 16, a heat outflow nozzle 17 is arranged with the air outflow direction into the shoulder and neck area of the vehicle occupants. Upstream of the heat exchanger 16, on the one side, an airstream inflow opening 18 is constructed with an inflow funnel exposed to the aerodynamic return or reverse flow of the airstream, and, on the other hand, a fan air inflow opening 20 is constructed, which is separate from the airstream inflow opening and to which one air blow-out connection piece 21 and 22 respectively of the fan 14 is connected. As illustrated in FIG. 2, the two air blow-out connection pieces 21, 22 are situated in the same plane and are arranged to be offset with respect to one another by 1800 on the circumference of the fan housing. In the installed position of the complete modular unit 10 illustrated in FIG. 1, the airstream inflow opening 18 is situated in an upper housing wall of the fan module 13, and the fan air inflow opening 20 is situated in the side wall of the modular housing 15 which extends at a right angle thereto and faces the fan 14. The central air intake opening 23 of the fan constructed as a radial-flow fan is also situated on the top side of the complete modular unit 10.

Figure 3:
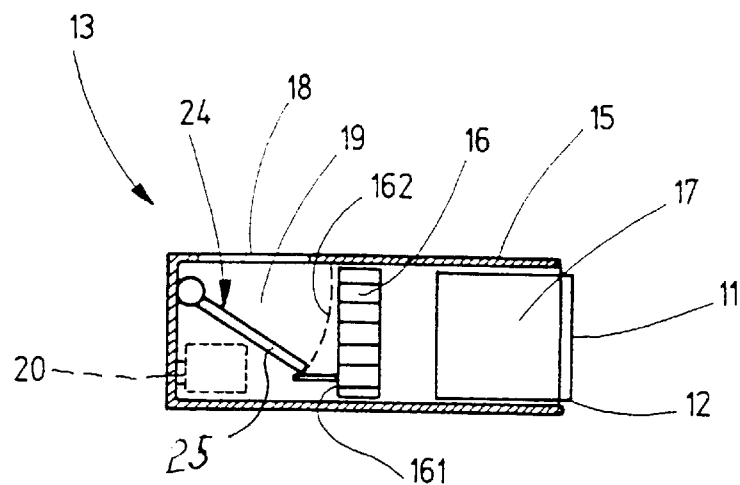
FIG. 3 is a schematic longitudinal sectional view of a heating module taken along section line III—III in FIG. 1.

For separating the airstream inflow opening 18 and the fan air inflow opening 20, a separating wall 24 (FIG. 3) is arranged in each modular housing 15 upstream of the heat exchanger 16, which separating wall 24 forms a wall of the inflow funnel 19 and is arranged such that it connects a smaller portion 161 of the air inlet surface of the heat exchanger 16 with the fan air inflow opening 20 and the larger portion 162 of the air inlet surface of the heat exchanger 16 with the airstream inflow opening 18. The separating wall 24 is composed of a swivel flap 25 and a fixed stop 26 which projects from the air inlet surface 161, 162 of the heat exchanger 16 and is used for limiting the maximal swivel movement of the swivel flap 25. The swivel flap 25 is dimensioned such that, in its other swivelling end position, it is capable of closing off the airstream inflow opening 18. By means of the swivel flap 25, the air quantity of the dynamic airflow can be regulated which is fed to the heat exchanger 16 by way of the inflow funnel 19.

For illustrating the assembly of the two heating modules 13 combined to a complete modular unit 10, FIG. 1 also shows the headrests 27 of the two vehicle seats as well as a wind partition 28 arranged behind the two headrests 27. It is clearly illustrated that the mouths 12 of the two air outflow openings 17 visually covered by the covering grids 11, viewed in the driving direction, are situated in front of the wind partition 28, thus between the wind partition 28 and the headrests 27. The aerodynamic return or reverse flow of the airstream has the reference number 29. The airflow taken in by the fan 14 is symbolized by an air arrow 30. The air flow flowing out of the air outflow nozzle 17 is marked 31. It is composed of a warm airflow triggered by the airstream 29 and a warm airflow generated by the fan 14. Its composition is changed depending on the position of the swivel flap 25.

Figure 4:
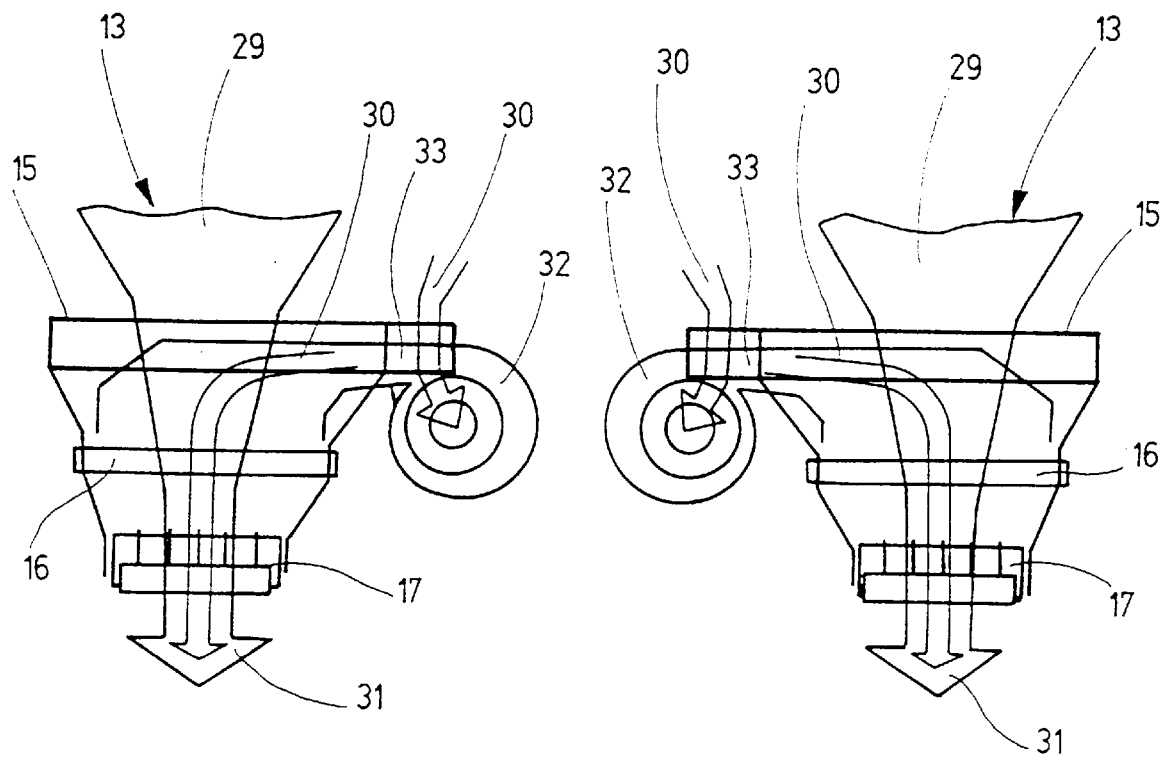
FIG. 4 is a top view of a supplementary heating system according to another embodiment of the invention.

FIG. 4 shows a modified embodiment of the above-described supplementary heating system. The two heating modules 13 for the two vehicle seats are not combined to a complete modular unit 10 but remain independent modules. In a corresponding manner, a fan 32 constructed as a radial-flow fan is also assigned to each heating module 13, the single blow-out connection piece 33 of the fan 32 being connected in an identical fashion to the fan air inflow opening 20 of the pertaining modular housing 15. The heating module 13 and the fan 32 connected therewith form a modular unit which is ready to be installed. Furthermore, each heating module 13 is constructed as described above so that identical components are provided with the same reference number.

The outlined air arrows again indicate the composition of the warm-air current 31 flowing out of each air outflow nozzle 17 of a heating module 13. The airflow 29 flowing in by way of the airstream inflow opening 18 and the inflow funnel 19 flows through the upper portion 162 of the air inlet surface of the heat exchanger 16, and the air current 30 which flows in through the fan air inflow opening 20 arranged laterally in the modular housing 15 and is generated by the fan 14 flows through the lower portion 161 of the air inlet surface of the heat exchanger 16. Downstream of the heat exchanger 16, the two airflows 29, 30 are combined to the air current 31 which acts upon the vehicle occupant's shoulder and neck area.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Supplementary heating system for open motor vehicles for supplying warm air to the shoulder and neck area of vehicle occupants sitting in vehicle seats, comprising:
   a heating module arranged on each vehicle seat, and each heating module including
      a heat exchanger,
      an air outflow nozzle arranged downstream of the heat exchanger and having an air outflow direction toward an occupant shoulder and neck area,
      an airstream inflow opening arranged upstream of the heat exchanger and having an inflow funnel exposed to aerodynamic return or reverse flow of an outside airstream, and
      a fan air inflow opening arranged upstream of the heat exchanger and separated from the airstream inflow opening.

2. System according to claim 1,
   wherein the heat exchanger is accommodated in a modular housing, on which the air outflow nozzle and the inflow funnel are constructed, and wherein separation of the airstream inflow opening and the fan air inflow opening takes place by means of a separating wall which connects a smaller portion of an air passage surface of the heat exchanger with the fan air inflow opening 20, and a larger portion of the air inlet surface of the heat exchanger with the airstream inflow opening.

3. System according to claim 2, wherein the separating wall, together with wall parts of the modular housing forms the inflow funnel adjoining the airstream inflow opening.

4. System according to claim 2, wherein the separating wall has a swivel flap which, when in one swivelling end position, is capable of covering the airstream inflow opening.

5. System according to claim 3, wherein the separating wall has a swivel flap which, when in one swivelling end position, is capable of covering the airstream inflow opening.

6. System according to claim 2, wherein, in the installed position of the heating module, the airstream inflow opening is situated in an upper housing wall, and the fan air inflow opening is situated in a lateral housing wall of the modular housing which extends at a right angle thereto.

7. System according to claim 3, wherein, in the installed position of the heating module, the airstream inflow opening is situated in an upper housing wall, and the fan air inflow opening is situated in a lateral housing wall of the modular housing which extends at a right angle thereto.

8. System according to claim 4, wherein, in the installed position of the heating module, the airstream inflow opening is situated in an upper housing wall, and the fan air inflow opening is situated in a lateral housing wall of the modular housing which extends at a right angle thereto.

9. System according to claim 5, wherein, in the installed position of the heating module, the airstream inflow opening is situated in an upper housing wall, and the fan air inflow opening is situated in a lateral housing wall of the modular housing which extends at a right angle thereto.

10. System according to claim 1, wherein an air blow-out connection piece of a fan is connected to each fan air inflow opening.

11. System according to claim 2, wherein an air blow-out connection piece of a fan is connected to each fan air inflow opening.

12. System according to claim 3, wherein an air blow-out connection piece of a fan is connected to each fan air inflow opening.

13. System according to claim 4, wherein an air blow-out connection piece of a fan is connected to each fan air inflow opening.

14. System according to claim 6, wherein an air blow-out connection piece of a fan is connected to each fan air inflow opening.

15. System according to claim 1, wherein a fan is provided which has two air blow-out connection pieces which are offset with respect to one another by approximately 180° in a circumferential direction of a fan housing, one air blow-out connection piece respectively being connected with the fan air inflow opening of a heating module.

16. System according to claim 7, wherein the fan is constructed as a radial-flow fan and is situated between two heating modules and has an air intake opening which is on top in the installed position.

17. System according to claim 15, wherein two of the heating modules and the fan are combined in a complete modular unit and are arranged in use in a vehicle body behind a backrest of two vehicle seats such that the air outflow nozzle in each case approximately ventilates a backrest of the vehicle seat.

18. System according to claim 17, wherein the two heating modules with the fan are installed behind a driver seat and a front passenger seat in the case of two-seat vehicles, and are installed behind the rear seats in the case of four-seat vehicles, in each case in the vehicle body.

19. A supplementary heating system for supplying warm air to the neck and shoulder area of a vehicle seat occupant in an open vehicle, comprising:

a heat exchanger arranged on a vehicle seat, an air outflow opening downstream of the heat exchanger operable to supply air heated in the heat exchanger toward an occupant shoulder and neck area, an airstream inflow opening operable to communicate portions of an outside airstream in the vehicle to the heat exchanger and having an inflow funnel exposed to the outside airstream, and a fan operable to generate an airflow and a fan air inflow opening operable to communicate the fan airflow to the heat exchange separately from the airstream.

20. A supplementary heating system according to claim 19, wherein separation of the airstream inflow opening and the fan air inflow opening takes place by means of a separating wall which connects a smaller portion of an air passage surface of the heat exchanger with the fan air inflow opening, and a larger portion of the air inlet surface of the heat exchanger with the airstream inflow opening.

\* \* \* \* \*